Feb. 9, 1937.    P. J. FABER    2,070,426
PROTECTIVE SEAL FOR ELECTRIC BATTERIES
Filed April 22, 1935
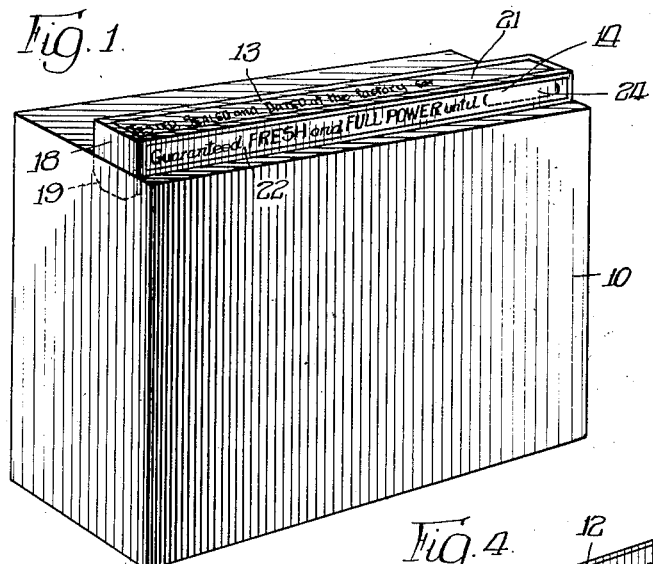
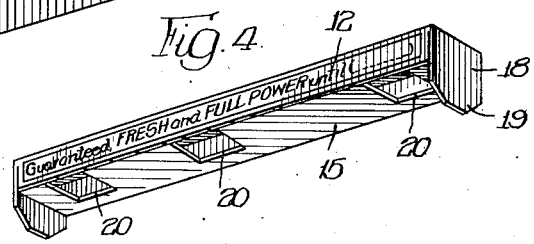
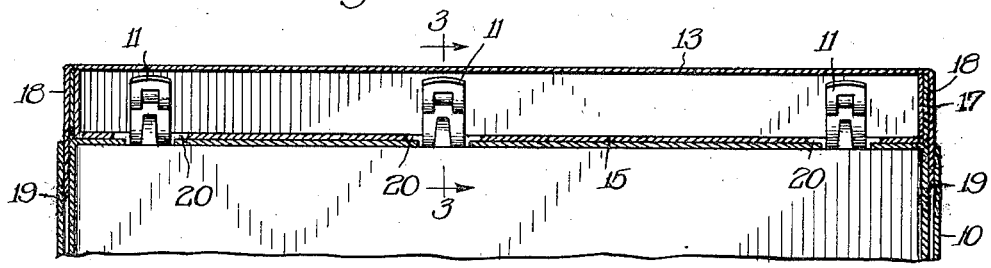
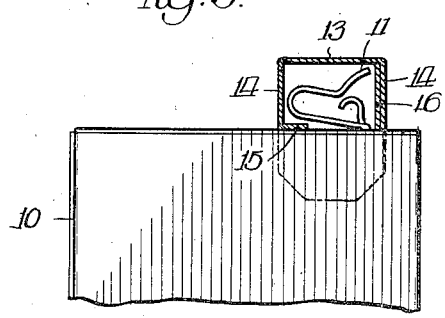
Inventor:
Peter J. Faber,
By [signature] attys.

Patented Feb. 9, 1937

2,070,426

UNITED STATES PATENT OFFICE 2,070,426

PROTECTIVE SEAL FOR ELECTRIC BATTERIES

Peter J. Faber, Chicago, Ill., assignor to Montgomery Ward & Co., Incorporated, Chicago, Ill., a corporation of Illinois Application April 22, 1935, Serial No. 17,577

7 Claims. (Cl. 136—132)

The present invention is related to a novel seal for protecting electric batteries so as to insure their maximum condition both as to strength and life at the time of their purchase. The invention is particularly applicable to batteries of the dry-cell type.

The object of the invention is the provision of a seal designed to cover the terminals of a battery and prevent access thereto until the battery is required for authorized use. Until the seal is broken or removed the battery remains unimpaired, and except for natural deterioration the condition of the battery is maintained the same as when it leaves the factory. The purchaser, therefore, thus may be assured that the battery has not been depleted as to its strength nor has the life of the battery been shortened.

The invention further aims to provide a seal of the character referred to which must be mutilated or destroyed before access may be had to the battery terminals, the condition of the seal indicating to the purchaser or user the fact as to whether or not the battery has been tampered with and the resultant impairment of the life of the battery.

Furthermore, the invention contemplates the provision of a seal of such nature that the date indicative of the time when the battery should be placed in use may be caused to appear, and thus afford assurance to the purchaser that fresh stock is being bought.

Other objects and advantages of the invention will appear as the nature of the improvements is better understood, the invention consisting in the novel construction, combination and arrangement of parts hereinafter fully described, illustrated in the accompanying drawing, and finally pointed out in the appended claims.

The form of the invention herein disclosed is believed to be a preferred embodiment thereof, but it is to be understood that the same is susceptible of change, modification and variation within the scope of the invention, and the form herein delineated is to be regarded as illustrative and not as imposing limitations on the invention.

In the drawing:

Fig. 1 is a perspective view of an electric battery of the dry-cell type having a protective seal associated therewith constructed in accordance with and embodying the principles of the present invention.

Fig. 2 is a longitudinal sectional view of the seal as applied to the battery.

Fig. 3 is a transverse sectional view, as on the line 3—3, Fig. 2.

Fig. 4 is a perspective view of the seal removed from the battery, or as it appears before its application to the battery.

Referring now in detail to the accompanying drawing, the numeral 10 designates a dry-cell electric battery, which battery is provided with a series of terminals 11 of conventional form, and to which conductors may be attached when these terminals are exposed.

The hereindescribed seal is designated by the numeral 12 and is in the form of an elongated box or housing having square corners so as to present a rectangular cross-sectional contour. The box or housing 12 preferably is formed of cardboard, or other flexible material capable of being bent to the desired shape. It includes a top 13, side walls 14 and a bottom or base wall 15 at the free edge of which is arranged a fastening tab 16 which is glued, or otherwise suitably connected, to the adjacent side wall 14. The side walls 14 are provided at their respective ends with inwardly folding flaps 17 that overlie, as clearly shown in Fig. 2, and at each end of the top 13 is a closure flap 18 which is folded over the overlying flap 17, and thereby closes the end of the box or housing 12. Each of the closure flaps 18 carries a sealing tab 19, these sealing tabs being of sufficient length so as to enter within the end walls of the battery 10, and be secured therein, as by gluing or other suitable fastening, to hold the sealing tabs 19 against withdrawal from the battery 10. In this manner the box or housing 12 is effectually held on to the battery 10 against displacement therefrom in covering relation to the terminals 11. The latter, therefore, are concealed within the box or housing 12 with the conductor-engaging zones thereof outwardly of bottom wall 15 and access to the same only can be had by mutilating or destroying the box or housing 12 in order to expose the terminals 11.

It will be observed that the lower wall 15 of the box or housing 12 is provided with a plurality of openings 20 spaced at suitable intervals, which openings receive the terminals 11 and permit the box or housing 12 to be applied to the battery so as to cover the terminals.

The exposed faces of the box or housing 12 may be provided with suitable legends or inscriptions, as at 21 and 22, indicating to the purchaser the conditions under which the battery has been produced and tested, as well as other facts of this nature to satisfy the purchaser as to the condition of the battery at the time it is bought. In addition thereto a space 24 is provided for the insertion of the date marking the limit at which the battery should be put into service in order to derive full benefit of its life and strength as when the same leaves the factory.

The sealing tabs 19 may be omitted, and glue or similar adhesive applied to the bottom wall 15 of the box or housing 12, thereby fastening the seal to the battery 10, and not permitting removal of the same therefrom until it has been torn open or otherwise mutilated to expose the terminals 11 for access and for connection thereto of proper conductors for leading the current from the battery.

Obviously, the hereindescribed invention affords a protective seal to prevent unauthorized use of the battery and depletion of its strength after the battery has left the factory and until the same reaches the purchaser. The purchaser thus is assured that a battery of full strength and life is being obtained at the time of purchase and that its life is not diminished except to the extent that natural deterioration curtails the same.

I claim:

1. A protective seal for an electric battery having exposed conductor-connecting terminals at one face thereof and the zones of conductor engagement of the terminals spaced outwardly from said face; comprising a housing having a wall, said terminals extending through said wall into the housing and locating said zones outwardly from said wall, means anchoring the housing on said battery with the said wall in intimate contact with said battery face about the terminals, and imperforate wall structure on said housing outwardly of and coacting with the said wall to completely enclose said terminals against access to said zones without mutilation of the housing.

2. A protective seal for an electric battery having exposed conductor-connecting terminals, comprising a housing having a face penetrated by said terminals, the housing outwardly of said face being imperforate and completely enclosing said terminals, said housing being anchored to the battery against tampering with said face in intimate engagement with the battery to prevent access to said terminals.

3. A protective seal for an electric battery having exposed conductor-connecting terminals at one face thereof, comprising an elongated housing, means sealing said housing to the battery in intimate contact against said face, said housing having wall structure outwardly of said face and extending thereto completely enclosing said terminals against access without mutilation of the housing.

4. A protective seal for an electric battery having exposed conductor-connecting terminals at one face thereof, comprising a housing, said housing having a base wall, side walls, end walls, an outer wall and flaps over said end walls, said base wall having openings through which the terminals extend into the housing, said walls and flaps coacting to enclose said terminals against access without mutilation of the housing, said flaps projecting beyond the other walls and sealing the housing to said face of the battery with the base wall in contact with the latter.

5. A protective seal for an electric battery having exposed conductor-connecting terminals at one face thereof, comprising an elongated housing of less area than said face disposed in intimate contact therewith, said housing having wall structure outwardly of said face enclosing said terminals against access without mutilation of the housing, and sealing means extending from the housing adjacent its ends interengaged with the battery.

6. A protective seal for an electric battery according to claim 5, wherein said sealing means are interengaged with the battery inwardly of the margin of the latter.

7. A protective seal for an electric battery having exposed conductor-connecting terminals, comprising a housing having a plurality of spaced openings in one of its sides penetrated by said terminals, the housing beyond said side completely enclosing said terminals to the exclusion of the remainder of the battery, and means holding said side to the battery.

PETER J. FABER.